US012600358B2

(12) United States Patent
Goers et al.

(10) Patent No.: US 12,600,358 B2
(45) Date of Patent: Apr. 14, 2026

(54) METHOD FOR HAVING A VEHICLE APPROACH A LOADING RAMP, CONTROL DEVICE, AND VEHICLE

(71) Applicant: ZF CV SYSTEMS GLOBAL GMBH, Bern (CH)

(72) Inventors: Andreas Goers, Pattensen (DE); Christoph Barth, Hannover (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 54 days.

(21) Appl. No.: 18/261,841

(22) PCT Filed: Jan. 6, 2022

(86) PCT No.: PCT/EP2022/050175
§ 371 (c)(1),
(2) Date: Jul. 18, 2023

(87) PCT Pub. No.: WO2022/161749
PCT Pub. Date: Aug. 4, 2022

(65) Prior Publication Data
US 2024/0034318 A1 Feb. 1, 2024

(30) Foreign Application Priority Data
Jan. 27, 2021 (DE) ..................... 10 2021 101 787.4

(51) Int. Cl.
*B60W 30/00* (2006.01)
*B60W 10/184* (2012.01)
*B60W 30/18* (2012.01)

(52) U.S. Cl.
CPC .... *B60W 30/18036* (2013.01); *B60W 10/184* (2013.01); *B60W 30/181* (2013.01); *B60W 2520/105* (2013.01); *B60W 2754/10* (2020.02)

(58) Field of Classification Search
CPC ......... B60W 30/18036; B60W 10/184; B60W 30/181; B60W 2520/105; B60W 2754/10
(Continued)

(56) References Cited

U.S. PATENT DOCUMENTS 3,986,577 A 10/1976 Ebbesson et al.
4,975,850 A * 12/1990 Diller .................. B60R 21/0132
180/274

(Continued)

FOREIGN PATENT DOCUMENTS

DE 2513880 A1 10/1975
DE 2929983 A1 2/1980
(Continued)

*Primary Examiner* — Resha Desai
(74) *Attorney, Agent, or Firm* — LEYDIG, VOIT & MAYER, LTD.

(57) ABSTRACT

The invention relates to a method for having a vehicle (1) approach a loading ramp (7), wherein the vehicle (1) has an acceleration sensor (19) which is designed to detect vehicle acceleration of the vehicle (1), the method comprising the following steps: —defining a vehicle speed of the vehicle (1) such that the vehicle (1) does not exceed a specified approach speed when approaching the loading ramp (7); —monitoring, over time, the vehicle acceleration measured by the acceleration sensor (19); —determining an approach state according to the vehicle acceleration monitored over time, wherein the approach state indicates whether or not the vehicle (1) and the loading ramp (7) touch; and —bringing the vehicle (1) to a standstill and/or keeping the vehicle (1) at a standstill if the vehicle (1) touching the loading ramp (7) has been determined as the approach state.

13 Claims, 3 Drawing Sheets

(58) Field of Classification Search
USPC ........................................................... 701/70
See application file for complete search history.

(56) References Cited

U.S. PATENT DOCUMENTS

| | | | | |
|---|---|---|---|---|
| 5,014,202 A * | 5/1991 | Thatcher | ................. | B60T 8/175 |
| | | | | 701/91 |
| 5,864,285 A * | 1/1999 | Wieder | ................. | B60W 30/06 |
| | | | | 340/436 |
| 2002/0017412 A1 * | 2/2002 | Pietsch | ............. | B60K 31/0008 |
| | | | | 180/169 |
| 2003/0111902 A1 * | 6/2003 | Thiede | ................... | G08G 1/161 |
| | | | | 303/193 |
| 2005/0114005 A1 * | 5/2005 | Gehring | ................... | B60T 7/22 |
| | | | | 180/282 |
| 2010/0039247 A1 | 2/2010 | Ziegler et al. | | |
| 2010/0318257 A1 * | 12/2010 | Kalinadhabhotla | ..... | G01P 21/00 |
| | | | | 701/31.4 |
| 2011/0190976 A1 * | 8/2011 | Goettsch | ............ | B60G 17/0162 |
| | | | | 701/31.4 |
| 2014/0303866 A1 * | 10/2014 | Roblin | ...................... | B60T 7/22 |
| | | | | 701/70 |
| 2015/0298738 A1 * | 10/2015 | Hoel | ...................... | B60W 30/06 |
| | | | | 701/41 |
| 2016/0031482 A1 * | 2/2016 | Lavoie | ........... | B60W 30/18036 |
| | | | | 701/41 |
| 2017/0088129 A1 * | 3/2017 | Iwasaki | .......... | B60W 30/18172 |
| 2017/0095918 A1 | 4/2017 | Schalbetter et al. | | |
| 2017/0106869 A1 * | 4/2017 | Lavoie | ...................... | B60T 7/20 |
| 2019/0039425 A1 * | 2/2019 | Dodd | .................... | B60W 10/20 |
| 2023/0237335 A1 * | 7/2023 | Hallac | ...................... | G07C 5/08 |
| | | | | 706/12 |

FOREIGN PATENT DOCUMENTS

| | | | | |
|---|---|---|---|---|
| DE | 10308668 A1 * | 7/2004 | ............... | B60Q 1/22 |
| DE | 10345748 A1 | 5/2005 | | |
| DE | 202005008450 U1 | 9/2005 | | |
| DE | 102005036794 A1 * | 2/2007 | ............... | B60T 7/18 |
| DE | 102013106878 A1 | 1/2015 | | |
| EP | 0972679 B1 | 9/2006 | | |
| EP | 2489531 A1 | 8/2012 | | |
| GB | 2177767 A | 1/1987 | | |
| WO | WO 03051697 A2 | 6/2003 | | |

* cited by examiner

METHOD FOR HAVING A VEHICLE APPROACH A LOADING RAMP, CONTROL DEVICE, AND VEHICLE

CROSS REFERENCE TO RELATED APPLICATIONS

This application is a U.S. National Phase application under 35 U.S.C. § 371 of International Application No. PCT/EP2022/050175, filed on Jan. 6, 2022, and claims benefit to German Patent Application No. DE 10 2021 101 787.4, filed on Jan. 27, 2021. The International Application was published in German on Aug. 4, 2022 as WO 2022/161749 A1 under PCT Article 21(2).

FIELD

The invention relates to a method for having a vehicle approach a loading ramp, a control device for a vehicle for carrying out the method, and the vehicle with such a control device.

BACKGROUND

Depots normally have loading ramps to which a vehicle, in particular a commercial vehicle, can approach to within a few centimeters for loading or unloading. When manually controlling the vehicle to the loading or unloading position, the driver steers the vehicle backwards until he feels a brake jerk due to a rear contact of the vehicle with the loading ramp. The vehicle is then held in this loading or unloading position by manual operation of the respective brake actuation element.

The manual approach to the loading ramp is carried out in this case depending on the experience of the driver, wherein too high a vehicle speed during a rear contact can lead to damage to the vehicle and/or the loading ramp. To mitigate this, loading ramps are known to absorb the energy on contact and feed it into the ground to avoid greater damage to both the vehicle and the building.

In addition, signals from a position detection system, such as GPS or the like, can be used to support the manual approach in order to estimate the position of the vehicle and thus a distance between the vehicle and the loading ramp. A distance to the loading ramp can also be estimated by means of signals from rear ultrasonic sensors or radar sensors. In DE 10,308,668 A1, an assistance function for having the vehicle approach a loading ramp by means of distance sensors is described by way of example, wherein the vehicle can be approached to the loading ramp to a distance of zero or up to a few centimeters.

The disadvantage of this is that the determination of the distance by means of the distance sensors mentioned is usually very inaccurate when a centimeter-accurate approach to the loading ramp is required. Wheel speed sensors, such as those used in WO 03 051 697 A2 for an approach to a loading ramp, are also very inaccurate at a low vehicle speed such as is normally set during an approach. If, instead, more accurate 3D lidar sensors or rear-facing cameras are used to determine the distance, the costs as well as the data processing effort in the vehicle increase.

Furthermore, in the case of a manual check, the driver must apply the brake at the right time in order to avoid rolling back too heavily after contact with the loading ramp. The manual approach process is therefore very complex and uncomfortable.

In order to simplify the approach process for the driver, assistance systems are known that partially automate the movement of the vehicle, at least in the longitudinal direction. Thus, from DE 20 2005 008 450 U1, GB 2 177 767 A1, E 2 929 983 A1 and DE 25 13 880 A1 approach buffers (bumpers) with integrated sensors are known, which trigger a signal in the event of contact with an object, for example the loading ramp, which leads to braking of the vehicle when at a standstill. In DE 10 2013 106 878 A1 the use of an additional contact sensor in addition to a distance sensor to simplify the approach of a vehicle with a trailer to a loading ramp is described. The contact sensor is triggered mechanically.

Furthermore, EP 0 972 679 B1 describes an automated method for docking a towing vehicle with a trailer to a loading ramp, wherein certain speeds are set when reversing on the basis of the signals from distance sensors and automated braking takes place. It is also provided that a slight contact of the approach buffer (bumper) of the trailer with the loading ramp is permitted and the vehicle combination of towing vehicle and trailer is stopped in the event of a detected contact.

SUMMARY

In an embodiment, the present disclosure provides a method for having a vehicle approach a loading ramp, wherein the vehicle has an acceleration sensor, and wherein the acceleration sensor is designed to detect a vehicle acceleration of the vehicle. The method comprises limiting a vehicle speed of the vehicle such that the vehicle does not exceed a specified approach speed when approaching the loading ramp and monitoring the vehicle acceleration measured by the acceleration sensor over time. The method also comprises determining an approach state according to the vehicle acceleration monitored over time, wherein the approach state indicates whether a contact between the vehicle and the loading ramp occurs or not. The method also comprises bringing the vehicle to a standstill and/or keeping the vehicle at a standstill if the contact of the vehicle with the loading ramp has been determined as the approach state.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
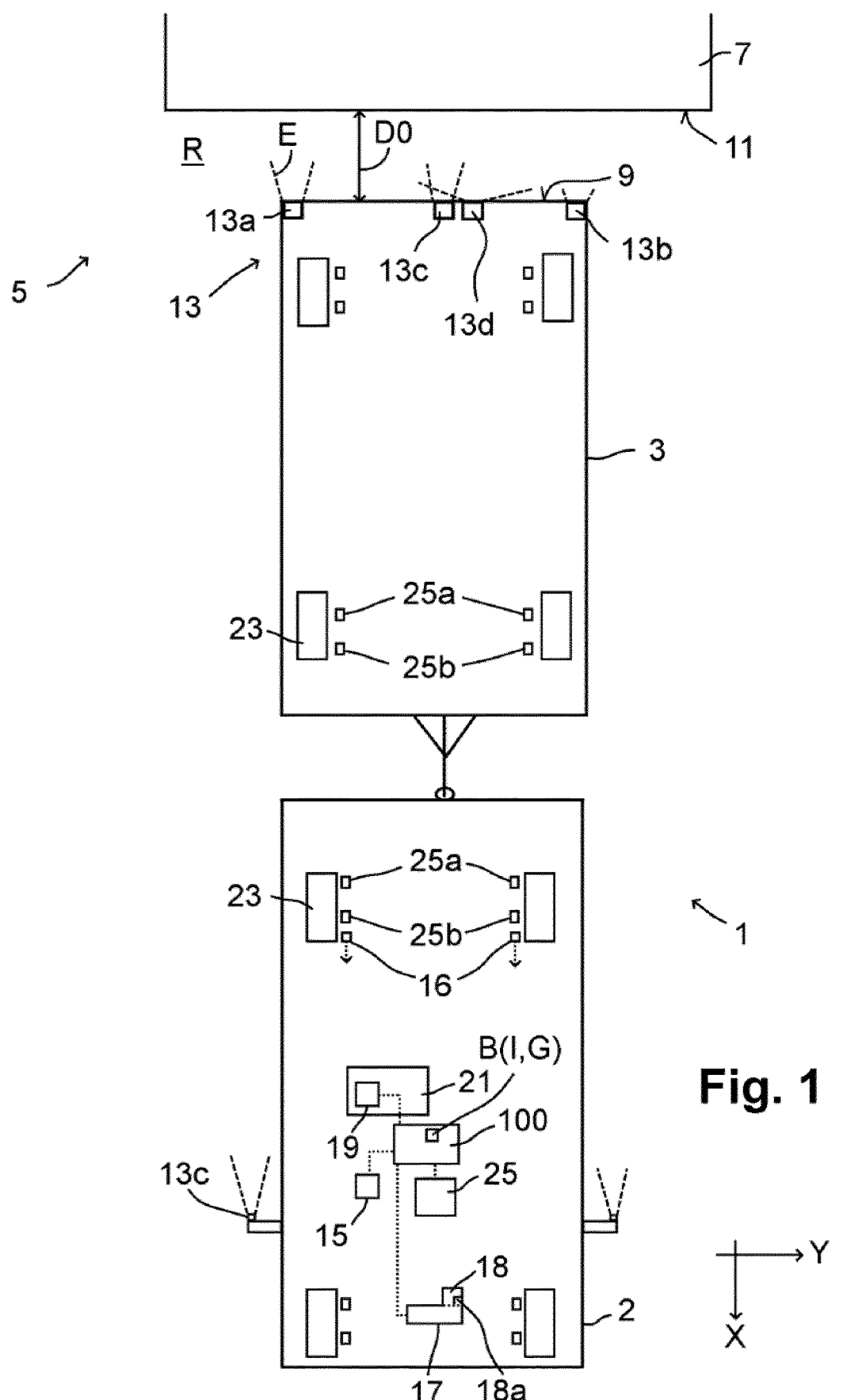
FIG. 1 shows a vehicle in a schematic view.

In an embodiment, the present invention provides a method for having a vehicle approach a loading ramp which is cost-effective, requires little effort, and is comfortable to perform. In an embodiment, a control device and a vehicle are provided.

According to an embodiment of the invention, therefore, a method is provided for having a vehicle approach a loading ramp, for example at a depot, a container yard, a loading point, or any other distribution centers, wherein the vehicle preferably approaches the loading ramp in a reversing movement, wherein the vehicle has an acceleration sensor, wherein the acceleration sensor is designed to detect a vehicle acceleration of the vehicle, preferably the vehicle acceleration in the longitudinal direction and optionally also in the transverse direction. An approach or docking of the vehicle to the loading ramp is to be understood to mean that the vehicle approaches up to a contact with the loading ramp and then continues to contact the loading ramp or remains within a few centimeters of it, so that a loading or unloading process can be carried out comfortably. At least the following steps are planned:

Limiting a vehicle speed of the vehicle in such a way that the vehicle does not exceed or may not exceed a specified approach speed during an approach to the loading ramp. This applies to both manual and automated control of a drive system of the vehicle and is intended to ensure that the vehicle does not approach the loading ramp too quickly, especially in the last few meters of the current approach process. Preferably, it may also be provided that manual control of the drive system by means of an accelerator pedal is prevented.

Monitoring the vehicle acceleration measured by the acceleration sensor over time, especially during vehicle speed limiting. During an approach, the vehicle acceleration is actively monitored continuously. Preferably, it may also be provided to monitor the vehicle speed after the limiting of the vehicle speed to the approach speed by means of a speed sensor and/or a revolution rate sensor in a gearbox of a drive system of the vehicle. As a result, the approach process can be additionally monitored, in particular the maintenance of the approach speed and/or the distance covered until contact, which can be derived from the vehicle speed.

Determining an approach state depending on the vehicle acceleration monitored over time, wherein the approach state indicates whether or not there has been contact between the vehicle and the loading ramp. Advantageously, therefore, the continuously monitored vehicle acceleration is used to determine whether contact with the loading ramp has taken place or not. This takes advantage of the fact that the vehicle changes its state of movement when it contacts the loading ramp. This can be demonstrated in a simple and reliable manner if a change in vehicle acceleration is detected, so that monitoring the vehicle acceleration over time can indicate such contact with the loading ramp. Preferably, it is provided that the determination of the approach state takes place only when the vehicle speed has been limited to the approach speed, so that the data processing effort can be minimized.

Bringing the vehicle to a standstill and/or holding the vehicle at a standstill, if a contact of the vehicle with the loading ramp has been determined as an approach state, wherein the vehicle is preferably decelerated to a standstill as a result of contact with the loading ramp. As a result, it can advantageously be achieved that the vehicle is immediately held at a standstill or brought to a standstill after a detected contact, wherein this can be done automatically, so that after a contact and the subsequent standstill the reaction is immediate. Rolling back after detecting a contact is therefore prevented or largely prevented, so that an actual distance between the vehicle and the loading ramp is as small as possible and therefore a loading or unloading process is simplified.

The method thus allows detection of a contact with the loading ramp in a simple and reliable way by recourse to an acceleration sensor in the vehicle and keeping the then preferably already stationary vehicle in this position. The approach process is therefore very comfortable for the driver. With a fully automated solution without a driver, the process is also safe and cost-effective, as no additional sensors are required in the vehicle. For example, a precisely measuring acceleration sensor can be used, which is already available in a vehicle with, for example, an electronic stability control system (ESC), so that costs are kept low.

Preferably, it is further provided that an actual distance between the vehicle and the loading ramp is determined or measured during an approach of the vehicle to the loading ramp. This preferably serves to limit the vehicle speed as soon as the determined actual distance falls below a specified approach distance when the vehicle is approaching the loading ramp. As a result, it can advantageously be achieved that the vehicle is slowed down only in the last few meters before the loading ramp, so that the approach process becomes more comfortable. The approach distance can, for example, be set to between 3.5 m and 4 m or adapted to the situation.

Preferably, it is further provided that the actual distance between the vehicle and the loading ramp is determined by means of a position detection system and/or an environment detection system, which for example has an ultrasonic sensor and/or a radar sensor and/or a lidar sensor and/or a camera. Accordingly, sensors already present in the vehicle can be used to estimate the actual distance at least roughly until the approach distance is reached and the controlled approach process according to the method according to an embodiment of the invention begins.

Preferably, it is provided in the context of this controlled approach process that the determination of the approach state to determine whether a contact between the vehicle and the loading ramp has taken place or not is carried out independently of the determined actual distance between the vehicle and the loading ramp. Instead, a measurement parameter is used for the approach process, which is easier and more accurate to determine for the critical area just before reaching the loading ramp at low vehicle speed. The actual distance is therefore mainly used to find a suitable time for the speed limiting. For detecting a contact, however, according to an embodiment of the invention the vehicle acceleration monitored over time is used.

Preferably, it is further provided that a contact between the vehicle and the loading ramp is determined as an approach state if it is determined that the vehicle acceleration reaches a specified acceleration limit and/or a vehicle jerk reaches or exceeds a specified jerk limit, wherein the vehicle jerk results from the vehicle acceleration by differentiation against time.

Therefore, according to an embodiment of the invention, monitoring the vehicle acceleration over time can be understood as both a direct tracking of the vehicle acceleration over time and a consideration of the change in vehicle acceleration over time, which is characterized by the differentiation against time or the vehicle jerk. From both variables, it can be determined by a corresponding determination of the respective limit whether normal deceleration has occurred as a result of a manual or an automated braking request or as a result of the vehicle coming into contact with the loading ramp. Contact with the loading ramp normally leads to a more abrupt deceleration of the vehicle with a higher deceleration, which can be determined accordingly by monitoring the vehicle acceleration over time.

Preferably, it is further provided that the acceleration limit and/or the jerk limit and/or the approach speed and/or the approach distance and/or an engine torque set for the current approach process is or will be adjusted depending on approach information from at least one previous approach process. Therefore, for example, it can be determined for the specific ramp how the approach process can be optimized using past observations. If, for example, the loading ramp is cushioned, a different vehicle acceleration or a different vehicle jerk is to be expected upon contact. The limits should therefore be adjusted accordingly. The vehicle speed for an approach as well as the torque to be set can also vary depending on the loading ramp which the vehicle is approaching and can therefore be adjusted depending on previous approach information. As approach information, the distance traveled determined from the measured vehicle speed can also be used, for example to determine the approach distance for a future approach process.

Preferably, it is further provided that a self-learning algorithm adjusts by self-learning the acceleration limit and/or the jerk limit and/or the approach speed and/or the approach distance and/or the engine torque set for the current approach process depending on the approach information from at least one previous approach process. The algorithm therefore advantageously learns with each approach from information made available to it by sensors. As a result, subsequent approach processes can be optimized in a simple way with little effort. Only an appropriately programmed self-learning algorithm is to be provided, to which this past approach information is transmitted.

Preferably, it is further provided that it is also monitored whether the vehicle is at a standstill, and the approach state is determined depending on whether the vehicle is in standstill, wherein a contact between the vehicle and the loading ramp is determined as an approach state when standstill of the vehicle is detected. Thus, in the simplest case, the detection of a contact depending on the monitoring of the vehicle acceleration over time can be plausibility checked. However, a detected standstill can also be used if no clear conclusions regarding contact between the vehicle and the loading ramp can be drawn from the vehicle acceleration monitored over time. The monitoring of vehicle acceleration over time is thus combined with the monitoring of the standstill.

Preferably, it may therefore be provided that when determining the standstill of the vehicle a contact between the vehicle and the loading ramp as an approach state is only then determined if the vehicle acceleration monitored over time also indicates a contact between the vehicle and the loading ramp and/or the vehicle speed does not change as a result of detecting the standstill despite an increase in engine torque, for example even if the vehicle acceleration monitored over time does not indicate contact between the vehicle and the loading dock. In this way, it can be ensured that the vehicle does not "get stuck" in a road depression, for example, and therefore the standstill is detected. If the vehicle still does not move as a result of an increase in engine torque, it can be assumed with a high degree of certainty that the loading ramp is already contacted even without a corresponding indication from the time profile of the vehicle acceleration and the vehicle is prevented from further movement.

Preferably, it is further provided that the vehicle is kept at a standstill by service brakes and/or parking brakes when contact of the vehicle with the loading ramp has been determined as an approach state. As a result, the current actual distance can be maintained quickly and safely after detection that the vehicle has been in contact with the loading ramp, so that the loading or unloading process can be carried out comfortably. Preferably, it may be provided that the vehicle is first kept at a standstill by the service brakes and the braking force is then shifted to the parking brakes. As a result, a braking force can first be quickly built up by the service brakes, which can then be safely maintained by the parking brake after the ignition has been switched off.

According to an embodiment of the invention, a control device for a vehicle for carrying out the method according to an embodiment of the invention is further provided, wherein the control device can be connected to an acceleration sensor for signal conducting and is designed, to limit a vehicle speed of the vehicle in such a way that the vehicle does not exceed a specified approach speed during an approach to a loading ramp;

to monitor a vehicle acceleration measured by the acceleration sensor over time;

to determine an approach state depending on the vehicle acceleration monitored over time, wherein the approach state indicates whether or not there has been contact between the vehicle and the loading ramp; and to bring the vehicle to a standstill and/or to keep it at a standstill if a contact of the vehicle with the loading ramp has been determined as an approach state.

Furthermore, according to an embodiment of the invention, a vehicle with a braking system, a drive system and a control device according to an embodiment of the invention is provided, wherein the vehicle has an acceleration sensor, for example as part of an electronic stability control system, wherein the acceleration sensor is designed to detect a vehicle acceleration of the vehicle, preferably in a longitudinal direction and optionally also in a transverse direction with respect to the vehicle, wherein the control device has a signal-conducting connection to the acceleration sensor for transmitting the measured vehicle acceleration to the control device, and the control device is further designed, to control the drive system to limit the vehicle speed to the approach speed and to control the braking system to bring the vehicle to a standstill and/or to keep the vehicle at a standstill if a contact of the vehicle with a loading ramp has been determined as an approach state.

Embodiments of the invention are explained in more detail below on the basis of an exemplary embodiment.

In FIG. 1, a vehicle 1 is shown schematically, which by way of example consists of a towing vehicle 2 and a trailer 3 (drawbar trailer). In principle, the method described below can be applied to any one-part or multi-part vehicle 1. The vehicle 1 is located, for example, on a depot 5, on which a loading ramp 7 is located, to which the vehicle 1 is to be approached or docked rearwards for a loading or unloading process.

Figure 5:
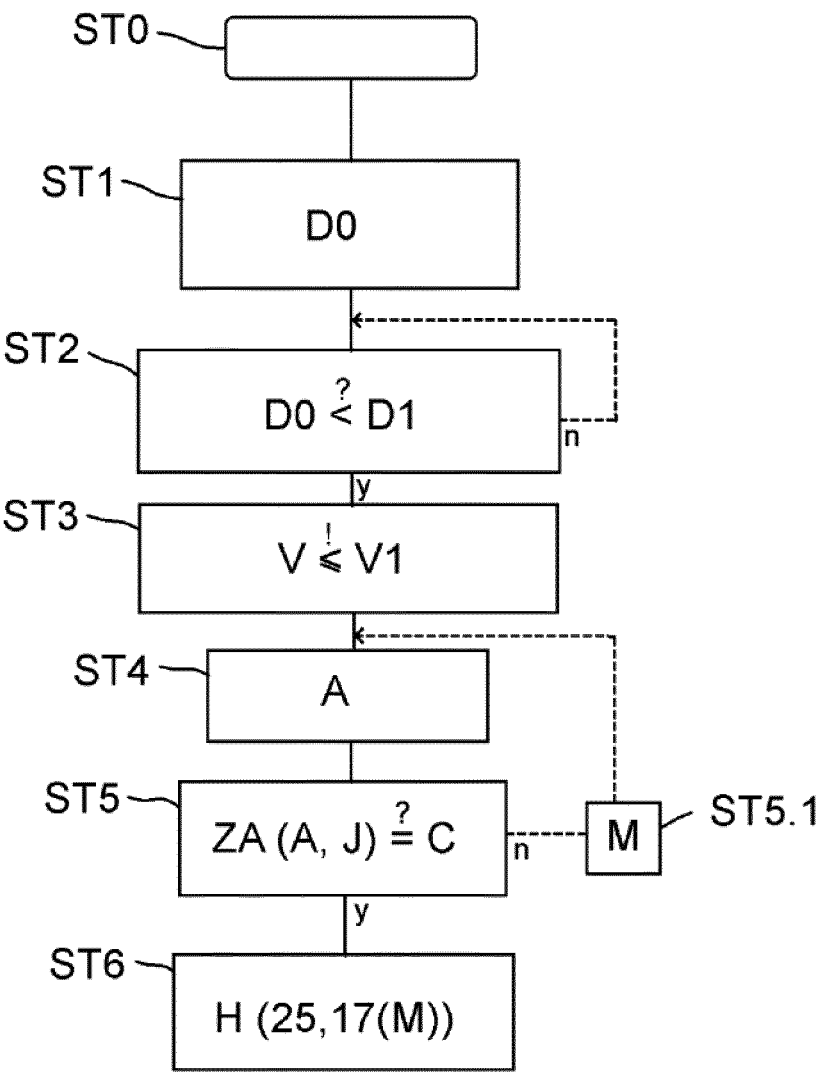
FIG. 5 shows a flowchart of a method according to an embodiment of the invention.

As soon as it has been recognized that the vehicle 1 is manually or (partially) automatically reversing to the loading ramp 7, the method according to an embodiment of the invention, which is carried out in a control device 100 in the vehicle 1, can be started (ST0). By way of example, the process sequence is illustrated in the flowchart in FIG. 5:

In a first step ST1, an actual distance D0 is estimated between a rear 9 of the vehicle 1 (in the embodiment shown the rear of the trailer 3) and a docking surface 11 of the loading ramp 7 which the vehicle 1 is approaching. The actual distance D0 can be estimated, for example, by means of an environment detection system 13, which is preferably arranged on the vehicle 1, i.e. on the towing vehicle 2 or on the trailer 3, and which is designed to monitor a rear area R behind the vehicle 1. The rear area R contains in particular the loading ramp 7, so that the environment detection system 13 is oriented to this accordingly.

The environment detection system 13 may, for example, comprise at least one ultrasonic sensor 13*a* and/or at least one radar sensor 13*b* and/or at least one LIDAR sensor 13*c* (for example, also on the mirror of the vehicle 1) and/or at least one camera 13*d*, by means of which the actual distance D0 can be estimated, as soon as the loading ramp 7 is located in the detection areas E (dashed line) of these sensors 13*a*, 13*b*, 13*c*, 13*d*. In addition or alternatively, a position detection system 15 may be provided in the vehicle 1, which determines a position of the vehicle 1 relative to the loading ramp 7 based on signals from any global navigation satellite system (GNSS), e.g. GPS, GLONASS, etc., wherein the actual distance D0 can also at least be estimated from this with knowledge of the position of the loading ramp 7.

Therefore, already existing sensors in the vehicle 1 can normally be used for a rough distance determination, wherein the environment detection system 13 or the position detection system 15 correspondingly has a signal-conducting connection to the control device 100. In this step, the actual distance D0 is only roughly estimated in order to be able to automatically determine an activation time for subsequent speed limiting. This can prevent the vehicle 1 from moving too long a distance with a speed limit and therefore can prevent the comfort for the driver being impaired. In principle, however, this step ST1 can also be omitted and the activation time can also be set automatically or manually in other ways.

For the speed limiting, in a second step ST2 it is checked whether the actual distance D0 determined in the first step ST1 falls below a predetermined approach distance D1. The approach distance D1 can be determined here depending on the accuracy of the environment detection system 13 or the position detection system 15 with which the actual distance D0 is determined. Regardless of this, the approach distance D1 can also be set between 4.5 m and 3 m, for example, on the basis of experience. Furthermore, an algorithm B may be provided to the control device 100, which, for example, adjusts the approach distance D1 in a self-learning manner, as described later.

If the actual distance D0 reaches or falls below the approach distance D1, in a third step ST3 the magnitude of the vehicle speed V of the vehicle 1 is limited by the control device 100 to an approach speed V1 (speed limiting). The approach speed V1 is, for example, less than 1 km/h, preferably less than 0.5 km/h, in particular about 0.2 km/h. By means of the algorithm B provided to the control device 100, the approach speed V1 can also be adjusted, for example in a self-learning manner, as explained in more detail later.

Despite manual or automated control of a drive system 17 of the vehicle 1, a vehicle speed V which is greater than the specified approach speed V1 cannot be achieved during reversing. For actual distances D0 which are smaller than the approach distance D1, the vehicle 1 moves backwards at most with the approach speed V1. The function of the accelerator pedal of the vehicle 1 can also be deactivated in addition by the control device 100 as soon as the distance is less than the approach distance D1.

The vehicle speed V can be monitored, for example, by active speed sensors 16 on the wheels 23 which are accurate even at low vehicle speeds V. In addition or alternatively, speed sensors 18*a* in a gearbox 18 of the drive train of the drive system 17 can be used, wherein the vehicle speed V can be determined from a revolution rate of the gearbox shafts, if appropriate taking into account the transmission ratio.

In a fourth step ST4, a vehicle acceleration A or a characteristic variable is continuously determined and monitored. The vehicle acceleration A is measured directly by at least one acceleration sensor 19 in the vehicle 1, wherein the acceleration sensor 19 is located in the towing vehicle 2 and/or the trailer 3. The acceleration sensor 19 is designed to detect the vehicle acceleration A at least in the longitudinal direction X with respect to the vehicle 1 and optionally also in the transverse direction Y.

In this case, an acceleration sensor 19 can be used which is already present as part of an electronic stability control system 21 (ESC) in the vehicle 1. The electronic stability control system 21 controls the stability of the vehicle 1 depending on the measured acceleration A in the longitudinal and/or transverse directions X, Y and optionally other variables, so that using this existing sensor the vehicle acceleration A can be determined with high precision even at low vehicle speeds V.

Preferably, no wheel speed sensor which measures the wheel revolution rates of the wheels 23 of the vehicle 1 is understood as an acceleration sensor 19 for the purposes of embodiments of the invention, wherein the vehicle acceleration A of the vehicle 1 can be concluded directly by deriving this speed-dependent measurement variable. Wheel revolution rate sensors conventionally cannot deliver reliable results for the rotational behavior of the wheels 23 at very low vehicle speeds V that are relevant to the approach according to embodiments of the invention due to their usual operation with a pole wheel. The vehicle acceleration A determined from the wheel revolution rates would therefore be error-prone or would not correspond with certainty to the actual vehicle acceleration A of the vehicle 1. A vehicle acceleration A determined in this way would not necessarily make the approach of the vehicle 1 to the loading ramp 7 more accurate and reliable. In this respect, an acceleration sensor 19 directly measuring the vehicle acceleration A is preferably used for the method according to embodiments of the invention.

Figure 2:
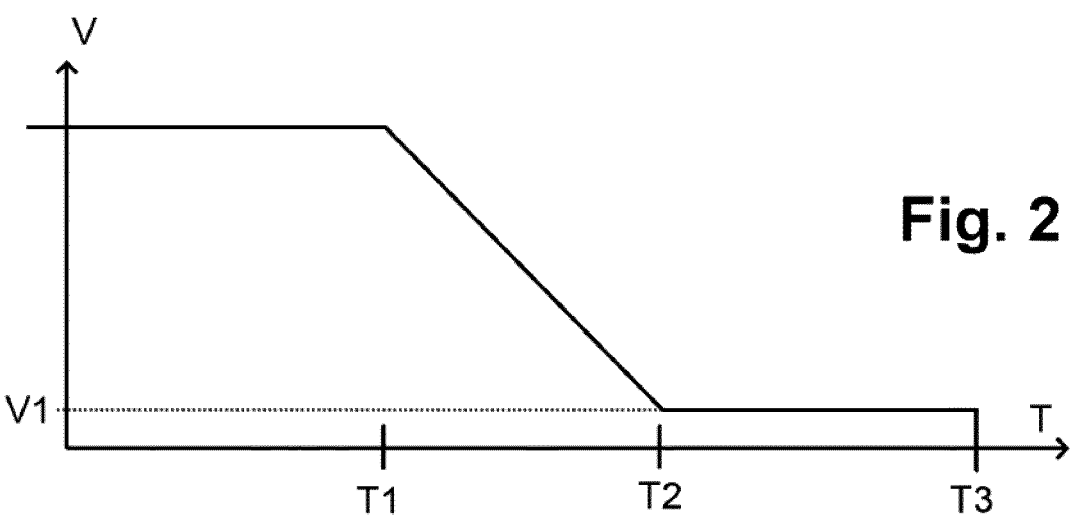
FIGS. 2, 3 and 4 show time profiles of a vehicle speed, a vehicle acceleration, and a vehicle jerk, respectively.

During the approach of the vehicle 1 to the loading ramp 7, an approach state ZA is determined or tested in a fifth step ST5 depending on the vehicle acceleration A measured or monitored in the fourth step ST4. For this purpose, the vehicle acceleration A is monitored over the time T and it is determined whether the behavior over time indicates an interaction or contact C between the vehicle 1 and the loading ramp 7. By way of example, the behavior of the vehicle 1 over time is shown in FIG. 2 (vehicle speed V), 3 (vehicle acceleration A), 4 (vehicle jerk J):

At a first time T1 after reaching the approach distance D1, the reduction of the vehicle speed V takes place as a result of the limiting of the vehicle speed V to the approach speed V1 in step ST3, wherein the approach speed V1 is reached or fallen below at a second time T2. Accordingly, a stage S in the vehicle acceleration A between the first and the second times T1, T2 is measured by the acceleration sensor 19.

After the second time T2, the vehicle speed V initially remains approximately constant in the exemplary embodiment shown.

Figure 3:
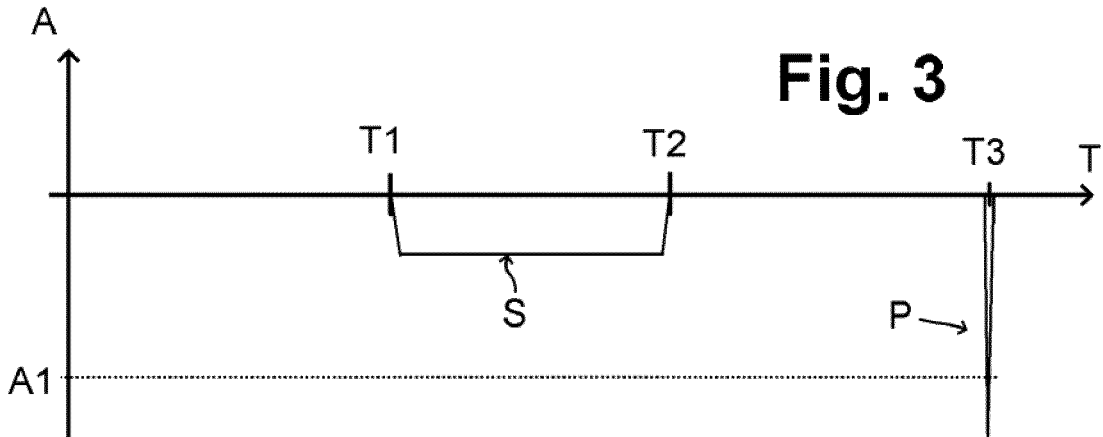
Figure 4:
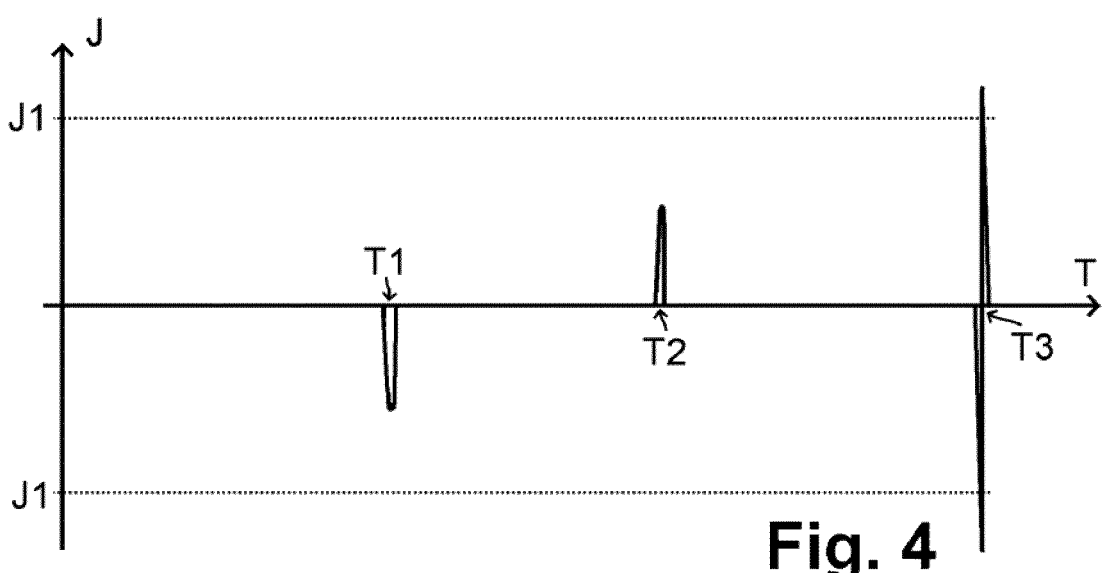

At a third time T3, the vehicle 1 is "stopped" during the backward movement or prevented from further movement by the loading ramp 7. This can be seen in the form of a peak P in the behavior of the vehicle acceleration A over time according to FIG. 3. The vehicle acceleration A thus first increases abruptly in magnitude due to the contact C with the loading ramp 7 (deceleration to a standstill H) and then drops again abruptly to zero as soon as the vehicle 1 is at a standstill H. Due to the contact C with the loading ramp 7, the vehicle 1 is thus simultaneously decelerated to a standstill H.

In order to clearly recognize such a contact C, it can be checked in the fifth step ST5, for example, whether the magnitude of the vehicle acceleration A exceeds an acceleration limit A1 and/or the magnitude of the vehicle jerk J exceeds a jerk limit J1. As can be seen from FIG. 3, the vehicle acceleration A does not fall between the times T1 and T2 as much as at time T3. A deceleration of the vehicle 1 as a result of an actively requested change in vehicle speed V is therefore clearly distinguished from an abrupt deceleration of the vehicle 1 as a result of contact C with the loading ramp 7. The vehicle jerk J at the times T1, T2 (actively requested deceleration) also differs from the vehicle jerk J at time T3 of a contact C with the loading ramp 7.

The limit values A1, J1 for the vehicle acceleration A and for the vehicle jerk J can therefore be determined in such a way that in a temporal consideration or analysis of the vehicle acceleration A it can be determined as clearly as possible whether a contact C with of loading ramp 7 occurs or not. Accordingly, this is output as an approach state ZA. Also, the limit values A1, J1 for the vehicle acceleration A and for the vehicle jerk J can be adjusted in the algorithm B on the control device 10, for example in a self-learning manner on the basis of observations or approach information I from one or more previous approach processes G, as explained in more detail.

If the approach state ZA indicates that the loading ramp 7 has been reached or contact C has taken place, a braking system 25 of the vehicle 1 is controlled in a sixth step ST6 in such a way that the vehicle 1 is kept at a standstill H, for example by automated actuation of the service brakes 25a and/or the parking brakes 25b of the vehicle 1, preferably in the towing vehicle 2 and the trailer 3. A redistribution may also be provided, i.e. first only the service brakes 25a are applied and the braking force is then shifted to the parking brakes 25b. As a result, a braking force can first be built up quickly and this can then be transferred to the permanently acting parking brake 25b. At the same time, the engine torque M is reduced to zero by controlling the drive system 17.

If neither reaching nor falling below the acceleration limit A1 nor the jerk limit value J1 can be determined in the fifth step ST5 until a vehicle speed V of zero is reached, the engine torque M converted by the drive system 17 is increased in an intermediate step ST5.1 and then the behavior over time of the acceleration A and/or vehicle speed V is/are monitored further. In particular, it is checked whether, as a result of the increase in engine torque M, the vehicle speed V increases again and/or subsequently the acceleration limit A1 or the jerk limit J1 is also reached or exceeded.

This intermediate step 5.1 serves to distinguish whether the vehicle 1 is "trapped" in a road depression or a rut at the low approach speed V1 as a result of insufficient engine torque M or the loading ramp 7 has already been reached without exceeding the respective limit values A1, J1, for example due to unexpected cushioning at the loading ramp 7 or insufficient measurement resolution of the acceleration sensor 19 or the like.

These observations can be used as approach information I by the algorithm B installed on the control device 100 to learn from previous approach processes G. The algorithm B can then adjust the acceleration limit A1 and/or the jerk limit J1 and/or the engine torque M and/or the approach speed V1 for subsequent approach processes in a self-learning manner, for example to no longer get stuck in the depression or to obtain a measurable vehicle response upon contact C with the loading ramp 7. It can also be taken into account, for example, whether after a successfully determined contact C, a peak P occurs with a certain vehicle acceleration A or according to a certain vehicle jerk J, which can be ramp-specifically redefined as limits A1, J1 for the subsequent approach processes. As a result, for example, ramp-specific cushioning can be taken into account in the event of a contact C. The algorithm B thus learns from the available approach information I from previous approach processes G and can adapt the strategy for future approach processes accordingly.

In this way, the self-learning algorithm B installed on the control device 100 can also adjust the approach speed V1 based on observations or approach information I from one or more previous approach processes G. If, for example, it has been found in one or more previous approach processes G that the contact C with the loading ramp 7 at the specified approach speed V1 leads to a very high vehicle acceleration A or a very high vehicle jerk J during a contact C (peak P), a corresponding ramp-specific reduction of the approach speed V1 can be provided. Thus, damage to the structure of the loading ramp 7 or to the vehicle 1 can be avoided. On the other hand, the approach speed V1 can be successively increased with each approach process if the change in vehicle acceleration A during the contact C is insufficient.

Also, the approach distance D1 can be adjusted by the algorithm B based on observations or approach information I from one or more preceding approach processes G. For example, if it is found that the actual distance D0 for a loading ramp 7 can be determined with increased reliability by the respective environment detection system 13 or position detection system 15 and/or the approach to the loading ramp 7 with the approach speed V1 has taken a very long time in a plurality of preceding approach processes G, the approach distance D1 can be successively reduced with each approach process under observation over time. For this purpose, information from other sensors in the vehicle 1 can also be used.

In this way, different approach speeds V1 and/or approach distances D1 and/or acceleration limits A1 and/or jerk limits J1 can be determined by the algorithm B for specific ramps by learning by observation or by recourse to existing approach information I and can be stored. Depending on the detected loading ramp 7, these can then be read in by the control device 100 during the next approach process.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

RELATED CHARACTER LIST (PART OF THE DESCRIPTION)

1 vehicle
2 towing vehicle
3 trailer
5 depot
7 loading ramp
9 rear of the vehicle 1
11 docking area of loading ramp 7
13 environment detection system
13a ultrasonic sensor
13b radar sensor
13c LIDAR sensor
13d camera
15 position detection system
16 speed sensor
17 drive system
18 gearbox
18a revolution rate sensors 18a in the gearbox 18
19 acceleration sensor
21 electronic stability control system (ESC)
23 wheels of the vehicle
25 braking system
25a service brake
25b parking brake
100 control device
A vehicle acceleration
B algorithm
C contact
D0 actual distance
D1 approach distance
E detection area
G previous approach process
H standstill
I approach information
M engine torque
P peak
R rear area
S step
T time
T1 first time
T2 second time
T3 third time
V vehicle speed V1 approach speed
ZA approach state
ST1, ST2, ST3, ST4, ST5.1, ST6 steps of the method

The invention claimed is:

1. A method for having a vehicle approach a loading ramp, wherein the vehicle has an acceleration sensor, and wherein the acceleration sensor is designed to detect a vehicle acceleration of the vehicle, the method comprising:
   limiting a vehicle speed of the vehicle such that the vehicle does not exceed a specified approach speed when approaching the loading ramp;
   monitoring the vehicle acceleration measured by the acceleration sensor over time;
   determining that contact between the vehicle and the loading ramp has occurred based on the vehicle acceleration monitored over time and based on a determination that a magnitude of the vehicle acceleration reaches and/or exceeds a specified acceleration limit; and
   bringing the vehicle to a standstill and/or keeping the vehicle at a standstill based on the determination that contact between the vehicle and the loading ramp has occurred,
   wherein the contact between the vehicle and the loading ramp is further determined based on a determination that a magnitude of a vehicle jerk reaches and/or exceeds a specified jerk limit, wherein the vehicle jerk results from the vehicle acceleration by differentiation against time,
   wherein the acceleration limit and/or the jerk limit and/or the approach speed is adjusted depending on approach information from at least one previous approach process, and
   wherein a self-learning algorithm adjusts the acceleration limit and/or the jerk limit and/or the approach speed in a self-learning manner depending on the approach information from the at least one previous approach process.

2. The method as claimed in claim 1, comprising determining an actual distance between the vehicle and the loading ramp while having the vehicle approach the loading ramp.

3. The method as claimed in claim 2, comprising limiting the vehicle speed as soon as the determined actual distance falls below a specified approach distance while having the vehicle approach the loading ramp.

4. The method as claimed in claim 2, wherein the actual distance between the vehicle and the loading ramp is determined using a position detection system and/or an environment detection system which includes an ultrasonic sensor (13a) and/or a radar sensor and/or a LIDAR sensor and/or a camera.

5. The method as claimed in claim 2, wherein the determination of the contact between the vehicle and the loading ramp is carried out independently of the determined actual distance between the vehicle and the loading ramp.

6. The method as claimed in claim 1, wherein the determination of the contact between the vehicle and the loading ramp takes place only when the vehicle speed has been limited to the approach speed.

7. The method as claimed in claim 1, comprising monitoring whether the vehicle is at a standstill; and
   determining that contact between the vehicle and the loading ramp has occurred based on a determination that the vehicle is at a standstill.

8. The method as claimed in claim 7, wherein on determining the standstill of the vehicle, contact between the vehicle and the loading ramp is determined if:

the vehicle acceleration monitored over time also indicates contact between the vehicle and the loading ramp and/or the vehicle speed does not change as a result of the detection of the standstill despite an increase in engine torque.

9. The method as claimed in claim 1, wherein the vehicle is kept at a standstill by service brakes and/or parking brakes when contact of the vehicle with the loading ramp has been determined.

10. The method as claimed in claim 9, wherein the vehicle is first kept at a standstill by the service brakes and the braking force is then shifted to the parking brakes.

11. The method as claimed in claim 1, wherein after the vehicle speed has been limited to the approach speed the vehicle speed is monitored by a speed sensor and/or a revolution rate sensor in a gearbox of a drive system of the vehicle.

12. A vehicle, comprising:

an acceleration sensor configured to detect a vehicle acceleration of the vehicle; and a controller configured to:

limit a vehicle speed of the vehicle such that the vehicle does not exceed a specified approach speed when approaching a loading ramp;

monitor the vehicle acceleration measured by the acceleration sensor over time;

determine that contact between the vehicle and the loading ramp has occurred based on the vehicle acceleration monitored over time and based on a determination that a magnitude of the vehicle acceleration reaches and/or exceeds a specified acceleration limit; and bring the vehicle to a standstill and/or keep the vehicle at a standstill based on the determination that contact between the vehicle and the loading ramp has occurred, wherein the contact between the vehicle and the loading ramp is further determined based on a determination that a magnitude of a vehicle jerk reaches and/or exceeds a specified jerk limit, wherein the vehicle jerk results from the vehicle acceleration by differentiation against time, wherein the acceleration limit and/or the jerk limit and/or the approach speed is adjusted depending on approach information from at least one previous approach process, and wherein a self-learning algorithm adjusts the acceleration limit and/or the jerk limit and/or the approach speed in a self-learning manner depending on the approach information from the at least one previous approach process.

13. The vehicle according to claim 12, the vehicle comprising:

a braking system; and a drive system;

wherein the controller is further configured to:

control the drive system to limit the vehicle speed to the approach speed, and control the braking system to bring the vehicle to a standstill and/or to keep the vehicle at a standstill based on the determination that contact between the vehicle and the loading ramp has occurred.

\* \* \* \* \*